United States Patent [19]

Itoh et al.

[11] Patent Number: 5,478,386

[45] Date of Patent: Dec. 26, 1995

[54] BIODEGRADABLE CELLULOSE ESTER COMPOSITION AND ARTICLE

[75] Inventors: Masanori Itoh, Kashiwa; Atsunobu Kiyose, Himeji; Katsumi Hirao, Akashi, all of Japan

[73] Assignee: Daicel Chemical Industries, Ltd., Osaka, Japan

[21] Appl. No.: 151,037

[22] Filed: Nov. 12, 1993

[30] Foreign Application Priority Data

Nov. 13, 1992 [JP] Japan .................................. 4-328646
Jul. 13, 1993 [JP] Japan .................................. 5-196819
Jul. 13, 1993 [JP] Japan .................................. 5-196820

[51] Int. Cl.$^6$ .............................. C08L 1/08; C08L 1/10; C08L 1/12
[52] U.S. Cl. .................. 106/169; 106/171; 106/177; 106/178; 106/180; 106/181; 106/182; 106/183; 106/189; 106/196; 106/199; 536/63; 536/69
[58] Field of Search .................... 106/169, 171, 106/178, 180, 181, 182, 183, 177, 189, 196, 199; 536/59, 63, 69

[56] References Cited

U.S. PATENT DOCUMENTS

| 3,781,381 | 12/1973 | Koleske et al. | 525/411 |
| 4,731,122 | 3/1988 | Cortese et al. | 106/198 |

FOREIGN PATENT DOCUMENTS

| 394803 | 10/1990 | European Pat. Off. . |
| 2128007 | 6/1971 | Germany . |
| 4316305 | 7/1943 | Japan . |
| 61-36015 | 8/1986 | Japan . |
| 61-276836 | 12/1986 | Japan . |
| 4142344 | 5/1992 | Japan . |
| 780479 | 8/1957 | United Kingdom . |
| WO9209654 | 6/1992 | WIPO . |
| WO9220738 | 11/1992 | WIPO . |

*Primary Examiner*—Anthony Green
*Attorney, Agent, or Firm*—Cushman Darby & Cushman

[57] ABSTRACT

The composition comprising a cellulose ester including at least 10 weight % of a low-substituted cellulose ester having an average degree of substitution not exceeding 2.15 and giving a 4-week decomposition rate of at least 60 weight % as determined using the amount of evolution of carbon dioxide as an indicator in accordance with ASTM 125209-91. The composition may contains a plasticizer, an aliphatic polyester, a photolysis accelerator such as anatase type titanium dioxide or a biodegradation accelerator such as organic acids and their esters. The low-substituted cellulose ester may be a cellulose ester having an average degree of polymerization from 50 to 250, an average degree of substitution from 1.0 to 2.15 and a residual alkali metal/alkaline earth metal-to-residual sulfuric acid equivalent ratio of 0.1 to 1.1. The biodegradable cellulose ester composition is suitable for the manufacture of various articles including fibrous articles such as tobacco filters.

31 Claims, No Drawings

5,478,386

BIODEGRADABLE CELLULOSE ESTER COMPOSITION AND ARTICLE

FIELD OF THE INVENTION

The present invention relates to a biodegradable cellulose ester composition and an article containing the composition.

BACKGROUND OF THE INVENTION

Regarding cellulose esters, cellulose acetate is used in such applications as tobacco filter, film, etc. while cellulose acetate butyrate and cellulose nitrate are used in lacquers and other applications. Meanwhile, cellulose esters are decomposed or degraded by ultraviolet light, heat, air and outdoor conditions in general but their decomposition (degradation) rates are extremely low as compared with cellulose. Therefore, when a used article made of cellulose ester is discarded outdoors, it retains its shape for a long time to become a cause of environmental pollution. Particularly when high-consumption articles such as cigaret filters are discarded outdoors, the risk of pollution is very great. Moreover, such articles discarded outdoors can hardly be completely recovered and would entail an almost prohibitive cost of recovery. Disposal of articles by incineration involves large outputs of combustion heat which detract considerably from the serviceable life of the incinerator.

Unlike the ordinary synthetic polymers, cellulose esters as such are not easily moldable so that plasticizers are generally included in the molding compounds. For example, Japanese Patent Publication No. 16305/1968 discloses a cellulose acetate molding compound containing a polyester having an average molecular weight of 700 to 4000 as synthesized from a glycol and an aliphatic dibasic acid as a polymer plasticizer. This plasticizer is reportedly well compatible with cellulose acetate having a degree of acetylation not less than 52% (degree of substitution not less than 2.2).

Japanese Patent Application Laid open No. 276836/1986 also discloses a cellulose derivative resin composition containing a phthalic acid-based polyester with an average molecular weight of about 250–3000 for improved plasticity, non-volatility and non-migration characteristics. In this composition, too, a cellulose ester having a degree of acetylation not less than 52.2% (degree of substitution not less than 2.2) is employed.

Japanese Patent Publication No. 36015/1986 further discloses a molding composition for improved resistance to thermal degradation or deformation and improved processability of moldings, which composition comprises 10 to 25 parts by weight of a plasticizer relative to 100 parts by weight of a cellulose acetate having a degree of acetylation in the range of 50 to 57% (degree of substitution 2.1 to 2.5) and a degree of polymerization in the range of 50 to 120.

U.S. Pat. No. 3,781,381 discloses a composition comprising an ε-caprolactone or other cyclic ester polymer as a modifier and a cellulose ester or other thermoplastic resin. This literature mentions a cellulose acetate with a degree of substitution equal to 2.5 (Example 14).

Furthermore, U.S. Pat. No. 4,731,122 discloses a thermoplastic resin molding composition comprising 35 to 70% of cellulose acetate butyrate, 10 to 40% of cellulose acetate, 15 to 30% of tributyl citrate, 5 to 30% of triethyl citrate and 1 to 10% of polyethylene glycol. The cellulose acetate butyrate used there has a butyryl group content of 17% and an acetyl group content of 29.5% (degree of substitution about 2.5) and the cellulose acetate used has an acetyl group content of 39.8% (degree of substitution about 2.5).

However, none of these known compositions reflect a consideration of biodegradability and actually all are lacking in biodegradability.

As a biodegradable resin composition containing a cellulose ester, Japanese Patent Application Laid open No. 142344/1992 proposes a biodegradable synthetic resin composition comprising 50 to 90 weight % of a cellulose ester, 0 to 40 weight % of a plasticizer and 5 to 30 weight % of an aliphatic polyester with an average molecular weight of 500 to 3000.

However, the biodegradability of this composition is largely dependent on the biodegradability of the plasticizer and aliphatic polyester added and the biodegradability of the cellulose ester as such is not remarkable. Moreover, because a citric acid ester or the like has to be used as the plasticizer, it is impossible to impart high moldability to the cellulose ester.

SUMMARY OF THE INVENTION

Therefore, it is a primary object of the invention is to provide a highly biodegradable composition containing a cellulose ester.

Another object of the invention is to provide a cellulose ester composition which is highly biodegradable despite inclusion of a poorly biodegradable cellulose ester.

It is still another object of the invention to provide a cellulose ester composition which enables the use of a conventional plasticizer and yet provides for satisfactory moldability and biodegradability.

A further object of the invention is to provide a shaped article as molded from said composition and a method for biodegrading the same.

It is a further object of the invention to provide a cellulose ester article which, if discarded outdoors, may be easily decomposed to reduce the risk of pollution.

A further object of the invention is to provide a highly biodegradable article made of biodegradable fiber.

As the result of intensive research to accomplish the above objects, the inventors of the present invention found that the degree of substitution of a cellulose ester has an important bearing on its biodegradability, that a cellulose ester having a certain degree of substitution is very stable under normal conditions and yet shows excellent biodegradability and that blending an ordinary cellulose ester with said cellulose ester having a certain degree of substitution results in a remarkably enhanced biodegradability of the former. The present invention has been completed on the basis of the above findings.

The biodegradable cellulose ester composition of the invention comprises a cellulose ester whose average degree of substitution is not more than 2.15 (substantially, O is not included) and at least 60 weight % of which is decomposed in 4 weeks when determined using the amount of evolved carbon dioxide as an indicator in accordance with ASTM 125209-91. Unless otherwise indicated, the cellulose ester having average degree of substitution of not more than 2.15 will be referred to briefly as the low-substituted cellulose ester.

The biodegradable cellulose ester composition of the invention may be a composition comprising a cellulose ester having an average degree of substitution of not more than 2.15, an average degree of polymerization of 50 to 250 and an equivalent ratio of residual alkali metal or alkaline earth metal relative to residual sulfuric acid in said cellulose ester of 0.1 to 1.1.

The biodegradable cellulose ester composition of the invention may further be a composition comprising the low-substituted cellulose ester alone or a composition comprising a plurality of cellulose esters varying in the degree of substitution but containing not less than 10 weight % of said low-substituted cellulose ester.

Furthermore, the composition of the invention may contain a plasticizer or an aliphatic polyester and a photolysis (photodegradation) accelerator or a biodegradation accelerator.

The shaped article of the present invention is comprised of said biodegradable cellulose ester composition. This shaped article may be a biodegradable molding of a plurality of cellulose esters varying in the degree of substitution or a fibrous article of the corresponding fiber or fibers.

DETAILED DESCRIPTION OF THE PREFERRED EMBODIMENTS

The cellulose ester includes, for example, organic acid esters of cellulose such as cellulose acetate, cellulose butyrate, cellulose propionate, etc., inorganic acid esters of cellulose such as cellulose nitrate, cellulose sulfate, cellulose phosphate, etc., and mixed esters such as cellulose acetate propionate, cellulose acetate butyrate, cellulose acetate phthalate, cellulose nitrate acetate and so on. These cellulose esters may be used independently or in combination. Among these cellulose esters, organic acid esters are preferred and particularly cellulose acetate is preferred.

The low-substituted cellulose ester contained in the cellulose ester composition has an average degree of substitution not exceeding 2.15, preferably in the range of about 1.0 to 2.15 and more preferably in the range of about 1.1 to 2.0. When the degree of substitution is less than 1.0, the water resistance of the article tends to be low. When it exceeds 2.15, the compatibility with other components, melt flow characteristic and biodegradability are considerably sacrificed.

The degree of substitution (DS) of the cellulose ester is defined as follows. Taking cellulose acetate as an example, DS can be calculated by means of the following equation.

$$DS = (162 \times Y)/(60 - 42 \times Y)$$

where $Y = X/100$ and $X$ represents the percentage of bound acetic acid (degree of acetylation).

The average degree of polymerization of the cellulose ester may range from 50 to 250, for instance, and is preferably about 100 to 200. When the average degree of polymerization is less than 50, the mechanical properties of the shaped article are sacrificed and when it exceeds 250, not only the fluidity and moldability of the composition but also the biodegradability of the article is adversely affected.

The average degree of polymerization (DP) of the cellulose ester may be determined by use of Ostwald's viscosimeter. For example, dropping times from the viscometer are determined for a solution of cellulose ester in a solvent and said solvent at 25° C., respectively, and the average degree of polymerization may be calculated by the following formulae.

$$\eta_{rel} = t/t_o$$

$$ln\ \eta_{rel} = 2.3026 \times log\ \eta_{rel}$$

$$[\eta] = (ln\ \eta_{rel})/C$$

$$DP = [\eta]/9 \times 10^{-4}$$

where $t$ represents a dropping time (second) of the solution of cellulose ester, $t_o$ represents a dropping time (second) of the solvent, and $C$ shows a concentration (g/l) of the cellulose ester in the solution. In the above method, acetone is usually used as a solvent and the concentration of cellulose ester in a solution is generally about 0.2% (w/v).

The low-substituted cellulose ester is not limited in type insofar as it is a highly biodegradable cellulose ester. The low-substituted cellulose ester thus includes, among others, cellulose esters giving 4-week decomposition rate of at least 60 weight %, preferably at least 65 weight % (e.g. 65 to 100%), in 4 weeks when determined using the amount of evolved carbon dioxide as an indicator in accordance with ASTM (American Society for Testing and Materials) 125209-91. In the determination of biodegradability, an active sludge of a municipal sewage treatment plant may be used as an active sludge. The decomposition rate of a cellulose ester can be found by converting the amount of evolved carbon dioxide to the number of carbon atoms and calculating its percentage relative to the total number of carbon atoms available prior to decomposition.

The equivalent ratio of residual alkali metal or alkaline earth metal to residual sulfuric acid in the cellulose ester has an important bearing on the biodegradability of the low-substituted cellulose ester. The highly biodegradable low-substituted cellulose ester includes cellulose esters in which the equivalent ratio of alkali metal and/or alkaline earth metal relative to residual sulfuric acid is about 0.1 to 1.1 and preferably about 0.5 to 1.5. When the equivalent ratio of alkali metal and/or alkaline earth metal to residual sulfuric acid is less than 0.1, the heat resistance is low and when it exceeds 1.1, the biodegradability of the cellulose ester is sacrificed.

The sulfuric acid is derived from the sulfuric acid used as the catalyst in the production of the cellulose ester. The sulfuric acid includes not only the free acid but also the sulfate salt, sulfoacetate and sulfate ester that may remain in the cellulose ester. The total amount of residual sulfuric acid in the cellulose ester, in terms of $SO_4^{2-}$, is generally about $1.8 \times 10^{-3}$ to $6.0 \times 10^{-2}$ weight % (corresponding to 0.005 to 0.1 mol %).

The alkali metal and/or alkaline earth metal is added as a neutralizer for the catalyst sulfuric acid as well as for the purpose of enhancing the thermal resistance of cellulose esters such as cellulose acetate. As to the mode of addition, such metal may be added to the reaction mixture after completion of the reaction or to the isolated product cellulose ester such as cellulose acetate.

As typical examples of the alkali metal, there may be mentioned lithium, potassium, sodium, etc. and the alkaline earth metal includes, for example, magnesium, calcium, strontium, barium, etc.

The biodegradable cellulose ester composition of the present invention may be a composition having the improved biodegradability which comprises a cellulose ester having an average degree of substitution of not more than 2.15, an average degree of polymerization of 50 to 250 and an equivalent ratio of residual alkali metal or alkaline earth metal relative to residual sulfuric acid in said cellulose ester of 0.1 to 1.1.

The biodegradable cellulose ester composition of the invention may be a composition comprising the low-substituted cellulose ester alone or a composition comprising a plurality of cellulose esters varying in the degree of substitution provided that it contains said low-substituted cellulose ester.

The latter composition comprising a plurality of cellulose esters varying in the degree of substitution contains said low-substituted cellulose ester and one or more other cellulose esters (unless otherwise indicated, referred to briefly as the high-substituted cellulose ester). The degree of substitution of the high-substituted cellulose ester need only be different from that of said low-substituted cellulose ester and the substituent group thereof may be the same as or different from the substituent group of the low-substituted cellulose ester. The high-substituted cellulose ester includes, for example, poorly biodegradable high-substituted cellulose esters (e.g. cellulose esters with degrees of substitution not less than 2.2 and preferably not less than 2.4). The preferred high-substituted cellulose ester is generally one having a substituent group identical or similar, preferably identical, to the substituent group of the low-substituted cellulose ester. Where the low-substituted cellulose ester is cellulose acetate, the identical or similar substituent group mentioned above include organic acid ester residues of about 1 to 4 carbon atoms.

The composition comprising a plurality of cellulose esters varying in the degree of substitution is characterized in that the biodegradability of the whole cellulose ester can be enhanced even when the proportion of the low-substituted cellulose ester is small. The low-substituted cellulose ester content of the composition is, for example, not less than about 10 weight %, preferably about 10 to 90 weight % and more preferably about 10 to 75 (e.g. 10 to 50) weight % based on the total cellulose ester. When the proportion of the low-substituted cellulose ester is not less than 10 weight %, the biodegradability of the poorly biodegradable cellulose ester is remarkably enhanced. The cellulose ester composition containing not less than 10 weight % of the low-substituted cellulose ester as a cellulose ester component is decomposed by not less than 20 weight %, preferably by not less than 25 weight %, as determined using the amount of evolution of carbon dioxide as an indicator in accordance with ASTM 125209-91. As the proportion of the low-substituted cellulose ester is increased, the resultant cellulose ester composition is biodegraded in a shorter time.

The mechanism of biodegradation which is involved in such a composition remains to be fully elucidated but it is supposed that microorganisms which, by nature, do not decompose high-substituted cellulose esters are adapted in the presence of even a minor proportion of the low-substituted cellulose ester so that they are rendered capable of decomposing the high-substituted cellulose ester as well.

The cellulose esters can be produced, irrespective of the degree of substitution, by a variety of processes well known in the art. Moreover, the degree of substitution of a cellulose ester can be adjusted in one step reaction between cellulose and an organic acid or acid anhydride or, alternatively, by preparing a highly substituted cellulose ester (e.g. a trisubstitution product) and adjusting its degree of substitution by subsequent partial hydrolysis.

The composition of the present invention need only contain said low-substituted cellulose ester but in order to enhance not only its moldability but also degradability, preferably contains at least one ingredient selected from the group consisting of a plasticizer, an aliphatic polyester, a photolysis accelerator and a biodegradation accelerator.

The compositions of the invention which contain such additive ingredients can be classified into the following categories.

(1) A composition comprising said cellulose ester and said plasticizer, (2) A composition comprising said cellulose ester and said aliphatic polyester, (3) A composition comprising said cellulose ester, said plasticizer and said aliphatic polyester, (4) A composition comprising said cellulose ester and said photolysis (photodegradation) accelerator, (5) A composition comprising said cellulose ester and said biodegradation accelerator, (6) A composition comprising said cellulose ester, said photolysis accelerator and said biodegradable accelerator, and (7) A composition comprising said cellulose ester, said plasticizer and/or aliphatic polyester, and said photolysis (photodegradation) accelerator and/or biodegradation accelerator.

For still further improved moldability and biodegradability, the composition containing the low-substituted cellulose ester is frequently used in the forms of (3) through (7) mentioned above. The photolysis (photodegradation) accelerator can be used in the form of (4) where it is used in combination with cellulose ester alone. In the form of (7), the plasticizer and aliphatic polyester are used in combination with the biodegradation accelerator and/or photolysis (photodegradation) accelerator in many instances.

The plasticizer mentioned above includes the variety of plasticizers used for the plasticization of cellulose esters, for example, aromatic polycarboxylic acid esters such as phthalic esters (e.g. dimethyl phthalate, diethyl phthalate, dibutyl phthalate, dihexyl phthalate, dioctyl phthalate, dimethoxyethyl phthalate, ethyl phthalylethyl glycolate, butyl phthalylbutyl glycolate, etc.), tetraoctyl pyromellitate, trioctyl trimellitate, etc., aliphatic polycarboxylic acid esters such as dibutyl adipate, dioctyl adipate, dibutyl sebacate, dioctyl sebacate, diethyl azelate, dibutyl azelate, dioctyl azelate, etc., lower fatty acid esters of polyhydric alcohols such as glycerol, trimethylolpropane, pentaerythritol, sorbitol, etc. (e.g. glycerin triacetate (triacetin), diglycerin tetracetate, etc.) and phosphoric acid esters such as triethyl phosphate, tributyl phosphate, tributoxyethyl phosphate, triphenyl phosphate, tricresyl phosphate and so on. These plasticizers can be used independently or in combination.

The aliphatic polyester includes, for example, polyesters formed by dibasic acids with glycols, polycaprolactones and other polyesters.

The dibasic acid mentioned above includes dicarboxylic acids of about 2 to 14 carbon atoms, for example saturated aliphatic dicarboxylic acids such as oxalic acid, succinic acid, adipic acid, sebacic acid, azelaic acid, sebacic acid, etc. and unsaturated aliphatic dicarboxylic acids such as fumaric acid, itaconic acid and so on. The glycol mentioned above includes glycols of about 2 to 12 carbon atoms such as ethylene glycol, diethylene glycol, triethylene glycol, 1,2-propanediol, dipropylene glycol, 1,3-butanediol, 1,4-butanediol, 2,2-dimethyl-1,3-propanediol, 1,6-hexanediol, neopentyl glycol, 3-methyl-1,5-pentanediol and so on. The dibasic acid and glycol can respectively be used independently or in combination.

The aliphatic polyester or linear polyester can be obtained by reacting a dibasic acid with a glycol. In conducting this reaction, a monoalcohol such as butanol, hexanol, 2-ethylhexanol, n-octanol or the like can be used as a molecular weight control agent. If necessary, a polyol such as glycerin, trimethylolpropane, etc. or a different polycarboxylic acid may be used in part.

The polycaprolactone mentioned above includes, for example, polycaprolactone (e.g. polycaprolactones having molecular weights in the range of about $1\times10^4$ to $10\times10^4$), caprolactonediol (e.g. caprolactonediols with molecular weights in the range of about 530 to 4000) and caprolactonetriols (e.g. caprolactonetriols with molecular weights in the range of about 300 to 2000).

For improved biodegradability, the molecular weight of said aliphatic polyester may be, for example, about 200 to $20 \times 10^4$, preferably about 300 to $10 \times 10^4$ and more preferably about 300 to $1 \times 10^4$.

The above-mentioned plasticizer and aliphatic polyester can be used in combination but need not be used depending on the biodegradability of said cellulose ester.

As typical examples of the photolysis (photodegradation) raccelerator, there may be mentioned benzoins, benzoin alkyl ethers, benzophenone and its derivatives such as benzophenone, 4,4'-bis(dimethylamino)benzophenone, etc., acetophenone and its derivatives such as acetophenone, $\alpha,\alpha$-diethoxyacetophenone etc., quinones, thioxanthones, phthalocyanine and other photosensitizers, anatase type titanium dioxide, ethylene-carbon monoxide copolymer, aromatic ketone-metal salt sensitizers and so on. These photolysis accelerators can be used independently or in combination. The preferred photolysis accelerator includes, for example, anatase type titanium dioxide.

By using a photolysis accelerator, the cellulose ester is rendered the more photodegradable. Therefore, even a shaped article can be provided with enhanced photodegradability and biodegradability.

There is virtually no limitation on the particle size of the titanium dioxide provided that the spinnability or moldability of the composition is not adversely affected. The particle size may for example be about 0.01 to 1 μm and is preferably about 0.05 to 0.5 μm. The specific surface area of titanium dioxide is generally about 3 to 30 m$^2$/g and preferably about 5 to 20 m$^2$/g. Compared with futile type titanium dioxide, anatase type titanium dioxide imparts high photodegradability to cellulose esters at low levels of addition.

As typical examples of the biodegradation accelerator, there may be mentioned organic acids such as oxo acids (e.g. oxo acids having about 2 to 6 carbon atoms, such as glycolic acid, lactic acid, citric acid, tartaric acid, malic acid, etc.) and saturated dicarboxylic acids (e.g. lower saturated dicarboxylic acids having about 2 to 6 carbon atoms such as oxalic acid, malonic acid, succinic acid, succinic anhydride, glutaric acid, etc.) and lower alkyl esters of such organic acids with alcohols having about 1 to 4 carbon atoms. The preferred biodegradation accelerator includes, for example, organic acids of about 2 to 6 carbon atoms, such as citric acid, tartaric acid, malic acid and so on. These biodegradation accelerators can also be used independently or in combination.

The biodegradation accelerator further includes biodegrading enzymes such as various hydrolase, e.g. lipase, cellulase, esterase and so on. The biodegrading enzymes can be immobilized on or in a water-soluble polymer or other support, or microencapsulated with a water-soluble polymeric shell material and, as such, be incorporated in, or deposited on, said cellulose ester composition or an article made therefrom.

The photolysis accelerator and biodegradation accelerator may be used in combination. Moreover, where a highly biodegradable cellulose ester is used, the use of said photolysis accelerator and/or biodegradation accelerator may not be essential.

The above-mentioned ingredient materials can be used in optional combinations and proportions. The proportion of a plasticizer and/or an aliphatic polyester in the composition is, for example, in the range of 0 to 100 parts by weight, preferably about 5 to 100 parts by weight and more preferably about 25 to 75 parts by weight based on 100 parts by weight of cellulose ester, and the amount of a photolysis accelerator and/or a biodegradation accelerator in the composition is, for instance, in the range from 0 to 5 parts by weight, preferably 0.005 to 5 parts by weight and more preferably 0.007 to 3 parts by weight relative to 100 parts by weight of cellulose ester. If the proportion of said accelerator and/or aliphatic polyester exceeds 100 parts by weight, the thermal resistance tends to be sacrificed, while the use of said photolysis accelerator and/or biodegradation accelerator in excess of 5 parts by weight tends to detract from moldability such as spinnability.

Referring to the composition not containing said plasticizer and/or aliphatic polyester, one preferred composition contains, based on 100 parts by weight of cellulose ester, about 0.1 to 5 parts by weight (preferably about 0.1 to 2.5 parts by weight and, for still better results, about 0.2 to 1 part by weight) of said photolysis accelerator. The photolysis accelerator includes anatase type titanium dioxide, among others. When the proportion of the photolysis accelerator is less than 0.1 part by weight, the photodegradability is not much increased, while the use of this additive in excess of 5 parts by weight tends to adversely affect on moldability such as spinnability. For enhancing the moldability of the above composition, the plasticizer and/or aliphatic polyester may be added in a proportion of about 5 to 100 parts by weight to each 100 parts of cellulose ester and/or said biodegradation accelerator may be added in a proportion of about 0.005 to 5 parts by weight, both relative to 100 parts by weight of cellulose ester.

Not only the low-substituted cellulose ester but also the high-substituted cellulose ester may contain the above ingredients in the same amount as mentioned above.

The composition of the invention may contain, where necessary, a variety of additives such as aging inhibitors, e.g. antioxidants and ultraviolet absorbers, fillers, antistatic agents, coloring agents and so The above composition is useful for the manufacture of various shaped articles. Such shaped articles can be manufactured by conventional molding processes such as extrusion, blow molding, foam molding, injection molding, casting, spinning and so on. The shaped articles may be fabricated or otherwise processed.

The shaped articles include a variety of cellulose ester-based articles such as films optionally creped, sheets, containing vessels, seedling pots, nets, bags, fibers, fibrous articles and so on. The preferred articles are the film, fiber and fibrous article providing large areas of contact with the environment for increased biodegradation. There is no particular limitation on the shape of the fibrous article. The fibrous article includes, as typical examples, woven fabrics, nonwoven fabrics, papers and sheets manufactured by web-forming processes, cords, knitted open-mesh articles, hollow fibers, tows, cigaret filters and so on. As the preferred fibrous articles, there may be mentioned, for example, nonwoven fabrics, papers, sheets, tows and cigaret filters (filter tips) comprising the fiber, blended fiber or yarn, or bundles of such fiber.

The fiber and fibrous article may respectively be comprised of blended fibers available from a plurality of cellulose esters varying in the degree of substitution, inclusive of the low-substituted cellulose ester and high-substituted cellulose ester. The proportion of the low-substituted cellulose ester in the blended fiber may for example be not less than 10 weight %, preferably about 10 to 90 weight % and more preferably about 10 to 50 weight %. When the proportion of the low-substituted cellulose ester fiber is not less than 10 weight %, the biodegradability of the poorly biodegradable cellulose ester fiber is remarkably increased. Moreover, the larger the proportion of the low-substituted cellulose ester, the shorter is the biodegradation time of the fibrous article.

As assayed in accordance with ASTM 125209-91, the above fibrous article containing the low-substituted cellulose ester fiber is decomposed by more than 20 weight % and preferably more than 25 weight % in 4 weeks.

The above-mentioned cellulose ester fiber can be obtained by the conventional spinning technology. For example, the cellulose ester, optionally together with the additive ingredients, is admixed with an organic solvent and the resulting composition is wet- or dry-spun. Alternatively, the additive ingredient such as a plasticizer is added to the cellulose ester and the composition is melt-spun. It is also possible to extrude the low-substituted cellulose ester and high-substituted cellulose ester independently and blend the two types of fiber, or where the low-substituted cellulose ester and high-substituted cellulose ester can be dissolved in a common solvent or melt-spun under common conditions, mix-extrude the low-substituted and high-substituted cellulose esters.

The fiber may be circular or elliptical, for instance, in cross-section and for an increased specific surface area, may be a modified cross-section fiber. The fineness of the monofilament is not so critical but is generally about 0.1 to 100 μm and preferably about 1 to 50 μm.

Referring, further, to the fibrous article, one or more biodegrading enzymes may be incorporated in, or deposited on, at least the low-substituted cellulose ester fiber. The same is true with the high-substituted cellulose ester fiber.

Among such biodegrading enzymes are the hydrolases mentioned hereinbefore, such as lipase, cellulase and esterase. The biodegrading enzyme can be added to said cellulose ester fiber, for example by immobilizing it on or in a water-soluble polymer or microencapsulating it with a water-soluble polymer and adding the resultant biodegrading enzyme-containing composition to the spinning dope. The biodegading enzyme may be deposited on the spun fiber, fiber aggregate, fiber bundle or fibrous article by the spray-coating, dipping or other method. When the fibrous article carrying the biodegrading enzyme so deposited or incorporated is contacted with water, the biodegrading enzyme is activated on dissolution of the water-soluble polymer or destruction of the microcapsules to thereby promote the degradation of the cellulose ester.

The still preferred fibrous article includes, for example, fibers or blended fibers integrated with a water-soluble adhesive, such as nonwoven fabrics, paper and other webs, etc., and fiber bundles or aggregates such as cigaret filters, in particular. When a water-soluble adhesive has been employed, the article is disintegrated into the constituent filaments on contact with water so that the biodegradability of the article is further increased.

As the water-soluble adhesive, there may be, for example, natural adhesives such as starch, modified starch, soluble starch, dextran, gum arabic, sodium alginate, protein (e.g. casein, gelatin, etc.), cellulose derivatives such as methylcellulose, hydroxyethylcellulose, carboxymethylcellulose, etc., and synthetic resin adhesives such as polyvinyl alcohol, polyvinylpyrrolidone, water-soluble acrylic resin and so on. These adhesives may be used independently or in combination.

The cigaret filter generally comprises a takeup paper for taking up a fiber bundle in a cylindrical form, a takeup size (adhesive) for bonding the takeup paper, the rail size, lap size, mouth-tip paper and the tip size for bonding the paper. The sizes (adhesives) mentioned above are also preferably said water-soluble adhesive. Thus, the preferred cigaret filter comprises a cylindrical takeup paper accommodating the fiber bundle, a cylindrical tip paper disposed at one end of the cylindrical takeup paper and a water-soluble adhesive for adhering the gluing margins of the takeup paper and tip paper to form a cylindrical assembly. Moreover, the takeup paper and tip paper are preferably made of paper which is disintegrated into constituent fibers on contact with water.

Since the composition and shaped article of the invention contain the low-substituted cellulose ester, they are highly biodegradable. Moreover, even the poorly biodegradable cellulose ester is rendered biodegradable by the presence of said low-substituted cellulose ester. Furthermore, the composition and shaped article containing the photolysis accelerator and/or biodegradation accelerator shows further improved biodegradability and the composition and article supplemented with the plasticizer and/or aliphatic polyester are excellent in moldability and biodegradability. Therefore, even if the article is discarded outdoors, it is rapidly decomposed, thus reducing the risk of pollution.

The intentional biodegradation of the article can be carried out under outdoor exposure conditions, for example at temperatures from about 0° to 50° C., preferably at temperatures from about 10° to 40° C., and about 30 to 90% relative humidity. To accelerate the biodegradation of the article, it is instrumental to expose the article to the soil or water containing microorganisms adapted or acclimatized to the cellulose and organic acid which are constituents of the cellulose ester. Using an active sludge containing such microorganisms, an enhanced biodegradability can be expected.

The following examples and comparative examples are intended to describe the invention in further detail and should by no means be construed as defining the scope of the invention.

EXAMPLES

In the examples and comparative examples, biodegradability was estimated by the following methods.

According to ASTM 125209-91, the active sludge of a municipal sewage treatment plant (Ibo River sewage treatment plant return sludge) was used as the active sludge. As the test sample, 2 grams of each test material was preliminarily frozen in liquefied nitrogen for 3 minutes and then ground in a coffee mill for 3 minutes. The ground material was frozen in liquefied nitrogen for 1 minute and then pulverized with a vibrating pulverizer for 3 minutes.

Using the test sample at a concentration of 100 ppm (charge 30 mg) and said active sludge at a concentration of 30 ppm (charge 9 mg), the test was carried out at 25°±1° C. for 4 weeks. The amount of evolved carbon dioxide was converted to the number of liberated carbon atoms and the decomposition rate was calculated as the percentage relative to the total number of carbon atoms in the test sample.

The total sulfuric acid in the cellulose acetate was determined by combusting the cellulose acetate powder in an electric furnace at 1300° C., trapping the evolved sulfurous acid gas in 10% hydrogen peroxide-water and titrating it with an aqueous solution of sodium hydroxide. The data are values in terms of $SO_4^{2-}$.

Example 1

Using 100 parts by weight of cellulose, 15 parts by weight of sulfuric acid, 280 parts by weight of acetic anhydride and 380 parts by weight of a solvent, the esterification reaction was conducted at 35° C. for 3 hours and the reaction mixture was then neutralized with calcium acetate. This cellulose acetate, 100 parts by weight, was hydrolyzed for 5 hours to provide a cellulose acetate having a degree of substitution equal to 2.14, a residual sulfuric acid content of $1.17\times10^{-2}$ weight % (0.031 mole %), a residual calcium-to-residual sulfuric acid mol ratio of 1.0 and a degree of polymerization equal to 185.

The cellulose acetate samples of Examples 1 to 3 and Comparative Examples 1 to 3, and the starting material cellulose of Comparative Example 4 were compared in terms of biodegradability. The results are shown in Table 1.

TABLE 1

|  | degree of substitution | equivalent ratio Ca/sulfuric acid | biodegradability (%) | | | |
| --- | --- | --- | --- | --- | --- | --- |
|  |  |  | 1 week | 2 weeks | 3 weeks | 4 weeks |
| Example 1 | 2.14 | 1.0 | 4 | 19 | 58 | 69 |
| Example 2 | 1.90 | 0.8 | 29 | 64 | 77 | 81 |
| Example 3 | 1.20 | 0.9 | 42 | 56 | 75 | 90 |
| Comparative Example 1 | 2.50 | 1.3 | 4 | 6 | 6 | 6 |
| Comparative Example 2 | 2.40 | 1.2 | 4 | 8 | 8 | 9 |
| Comparative Example 3 | 2.20 | 1.2 | 3 | 5 | 8 | 11 |
| Comparative Example 4 | 0 | — | 59 | 83 | 84 | 86 |

Example 2

In a manner analogous to Example 1, a cellulose acetate having a substitution degree of 1.90, a residual sulfuric acid content of $0.98\times10^{-2}$ weight % (0.025 mole %), a residual calcium-to-residual sulfuric acid mol ratio of 0.8 and a polymerization degree of 160 was prepared.

Example 3

In the same manner as in Example 1, a cellulose acetate with a substitution degree of 1.20, a residual sulfuric acid content of $0.58\times10^{-2}$ weight % (0.013 mole %), a residual calcium-to-residual sulfuric acid mol ratio of 0.9 and a polymerization degree of 148 was prepared.

Comparative Example 1

In the same manner as in Example 1, a cellulose acetate with a substitution degree of 2.50, a residual sulfuric acid content of $1.25\times10^{-2}$ weight % (0.035 mole %), a residual calcium-to-residual sulfuric acid mol ratio of 1.3 and a polymerization degree of 195 was obtained.

Comparative Example 2

In the same manner as in Example 1, a cellulose acetate with a substitution degree of 2.40, a residual sulfuric acid content of $1.23\times10^{-2}$ weight % (0.034 mole %), a residual calcium-to-residual sulfuric acid mol ratio of 1.2 and a polymerization degree of 193 was obtained.

Comparative Example 3

In the same procedures as in Example 1, a cellulose acetate with a substitution degree of 2.20, a residual sulfuric acid content of $1.11\times10^{-2}$ weight % (0.030 mole %), a residual calcium-to-residual sulfuric acid mol ratio of 1.2 and a polymerization degree of 183 was obtained.

Comparative Example 4

The starting material cellulose used in Example 1 was subjected to biodegradability testing.

It is apparent from Table 1 that despite acetylation, the cellulose acetates of Examples 1 to 3 show high biodegradability.

Example 4

One-hundred (100) parts by weight of the cellulose acetate having a substitution degree of 2.14 as obtained in Example 1 was blended with 20 parts by weight of polycaprolactonetriol as an aliphatic polyester (Plaxcel 303, molecular weight 300, manufactured by Daicel Chemical Industries Ltd.; Japan), 20 parts by weight of diethyl phthalate as a plasticizer, and 0.02 parts by weight of citric acid and the resultant mixture was melt-extruded to provide a shaped article in the form of a film (0.05 mm thick).

Comparative Example 5

A shaped article in the form of a film was produced in the same manner as in Example 4 except that a cellulose acetate having a substitution degree of 2.50 was used in lieu of the cellulose acetate with a substitution degree of 2.14.

Example 5

One-hundred (100) parts by weight of the cellulose acetate having a substitution degree of 2.14 as obtained in Example 1 was blended with 40 parts by weight of diethyl phthalate as a plasticizer, 15 parts by weight of an ethylene glycol-adipic acid polyester (molecular weight 2000) as an aliphatic polyester, and 0.02 part by weight of citric acid and the resultant mixture was melt-extruded to provide a shaped article in the form of a sheet (0.5 mm thick).

Comparative Example 6

A shaped article in the form of a sheet was produced in the same manner as in Example 5 except that a cellulose acetate with a substitution degree of 2.50 was used in lieu of the cellulose acetate with a substitution degree of 2.14.

The shaped articles of Examples 4 and 5 and Comparative Examples 5 and 6 were compared in terms of biodegradability. The results are shown in Table 2.

TABLE 2

| | biodegradability (%) | | | |
|---|---|---|---|---|
| | 1 week | 2 weeks | 3 weeks | 4 weeks |
| Example 4 | 23 | 30 | 45 | 70 |
| Example 5 | 25 | 34 | 50 | 75 |
| Comparative Example 5 | 14 | 20 | 23 | 23 |
| Comparative Example 6 | 19 | 22 | 23 | 23 |

It is apparent from Table 2 that the shaped articles obtained from the compositions of Examples 4 and 5 show high biodegradability.

Example 6

To 100 parts by weight of the cellulose acetate with a substitution degree of 2.14 as obtained in Example 1 was added 0.5 part by weight of anatase type titanium dioxide (average particle diameter 0.3 µm) and the mixture was dispersed in 235 parts by weight of a mixed solvent of acetone and water (96.5/3.5, by weight) to prepare a spinning dope. Using this dope, dry spinning was carried out to prepare 5-denier filaments.

Example 7

The procedure of Example 6 was repeated except that the addition of anatase type titanium dioxide was omitted to provide 5-denier filaments.

When the filaments of Examples 6 and 7 were subjected to biodegradability testing, results comparable to those of Example 1 were obtained, attesting to their high biodegradability. Moreover, filaments obtained in Examples 6 and 7 were subjected to weather resistance testing using a fade-O-meter according to JIS L-1013 and the tensile strength and tensile elongation were determined. The photodegradability of the filaments was also evaluated by plotting the time course of retention of filament strength and elongation with the tensile strength and elongation values prior to irradiation being taken as 100. The results are set forth in Table 3.

TABLE 3

| | | irradiation time (hours) | | | | |
|---|---|---|---|---|---|---|
| | | 0 | 50 | 100 | 150 | 200 |
| Example 6 | tensile strength (retention %) | 100 | 88 | 78 | 66 | 54 |
| | tensile elongation (retention %) | 100 | 90 | 43 | 55 | 11 |
| Example 7 | tensile strength (retention %) | 100 | 134 | 129 | 111 | 106 |
| | tensile elongation (retention %) | 100 | 95 | 41 | 56 | 33 |

It is apparent from Table 3 that the filament according to Example 6 shows high photodegradability with greater light-associated decreases in strength and elongation.

The influence of the crystal form of commercial titanium dioxide for pigment use was also investigated. Thus, a reaction system comprising 30 mg of titanium dioxide, 100 ppm of ethanol and 40 ml of water was irradiated with xenon light (1 kW) at a distance of 25 cm and the UV-associated decrease in the amount of ethanol was determined by the atmospheric loss of organic substance method to find the percent decrease of ethanol.

As a result, when the rutile type titanium dioxide (average particle diameter 0.3 µm, specific surface area 6 $m^2/g$) was used, the loss of ethanol was 3 weight % after 30 minutes of UV irradiation and 4 weight % after 1 hour of the exposure. In contrast, when the anatase type titanium dioxide (average particle diameter 0.3 µm, specific surface area 9 $m^2/g$) was used, the loss of ethanol was 30 weight % after 30 minutes of UV exposure and 72 weight % after 1 hour of exposure.

Example 8

Using 100 parts by weight of cellulose, 15 parts by weight of sulfuric acid, 280 parts by weight of acetic anhydride and 380 parts by weight of a solvent, the esterification reaction was conducted at 35° C. for 3 hours and the reaction mixture was then neutralized with calcium acetate. The resultant cellulose acetate, 100 parts by weight, was hydrolyzed for 5 hours to provide a cellulose acetate having a substitution degree of 1.24, a residual sulfuric acid content of $0.58 \times 10^{-2}$ weight % (0.013 mole %), a residual calcium-to-residual sulfuric acid mol ratio of 0.9 and a polymerization degree of 148.

Ten (10) weight % of the resultant cellulose acetate having a substitution degree of 1.24 was blended with 90 weight % of a commercial cellulose acetate (degree of substitution 2.45) to provide a cellulose ester composition.

Comparative Example 7

The same commercial cellulose acetate (degree of substitution 2.45) as used in Example 8 was employed.

Comparative Example 8

Five (5) weight % of the cellulose acetate with a substitution degree of 1.24 as obtained in Example 8 was blended with 95 weight % of the same commercial cellulose acetate (degree of substitution 2.45) as used in Example 8 to provide a cellulose ester composition.

Example 9

In a manner analogous to Example 8, a cellulose acetate with a substitution degree of 2.1, a residual sulfuric acid content of $1.17 \times 10^{-2}$ weight % (0.031 mole %), a residual calcium-to-residual sulfuric acid mol ratio of 1.0 and a polymerization degree of 185 was provided.

Ten (10) weight % of this cellulose acetate having a substitution degree of 2.1 was blended with 90 weight % of the same commercial cellulose acetate (degree of substitution 2.45) as used in Example 8 to provide a cellulose ester composition.

Comparative Example 9

In the same manner as in Example 8, a cellulose acetate having a substitution degree of 2.26, a residual sulfuric acid content of $1.11 \times 10^{-2}$ weight % (0.030 mole %), a residual calcium-to-residual sulfuric acid mol ratio of 1.2 and a polymerization degree of 183 was provided.

Ten (10) weight % of this cellulose acetate with a substitution degree of 2.26 was blended with 90 weight % of the same commercial cellulose acetate (degree of substitution 2.45) as used in Example 8 to provide a cellulose ester composition.

The compositions obtained in Examples 8 and 9 and Comparative Examples 7 to 9 were compared in terms of biodegradability. The results are shown in Table 4.

TABLE 4

| | biodegradability (%) | | | |
| --- | --- | --- | --- | --- |
| | 1 week | 2 weeks | 3 weeks | 4 weeks |
| Example 8 | 2 | 13 | 20 | 30 |
| Comparative Example 7 | 0 | 0 | 0 | 0 |
| Comparative Example 8 | 0 | 0 | 2 | 5 |
| Example 9 | 1 | 14 | 22 | 25 |
| Comparative Example 9 | 0 | 0 | 0 | 1 |

It is apparent from Table 4 that although they contained the cellulose acetate of Comparative Example 7 which gave a 4-week decomposition rate of 0%, the cellulose ester compositions of Example 8 and 9 showed high biodegradability with decomposition rates of 25% and 30%, respectively. The composition of Comparative Example 8 which contained 5 weight % of the low-substituted cellulose ester showed a low 4-week decomposition rate of 5% and the composition of Comparative Example 3 showed only 1% decomposition.

Example 10

Using 100 parts by weight of cellulose, 15 parts by weight of sulfuric acid, 280 parts by weight of acetic anhydride and 380 parts by weight of a solvent, the esterification reaction was conducted at 35° C. for 3 hours and the reaction mixture was then neutralized with calcium acetate. The resultant cellulose acetate, 100 parts by weight, was hydrolyzed for 5 hours to provide a cellulose acetate having a substitution degree of 1.24, a residual sulfuric acid content of $0.58 \times 10^{-2}$ weight % (0.013 mole %), a residual calcium-to-residual sulfuric acid mol ratio of 0.9 and a polymerization degree of 148. This cellulose acetate with a substitution degree of 1.24 was spun to provide a low-substituted cellulose ester fiber.

Ten (10) weight % of the above low-substituted cellulose ester fiber was blended with 90 weight % of a commercial cellulose acetate (degree of substitution 2.45) fiber to provide a blended fiber tow for cigaret filters.

Example 11

In a manner analogous to Example 10, a cellulose acetate with a substitution degree of 2.1, a residual sulfuric acid content of $1.17 \times 10^{-2}$ weight % (0.031 mole %), a residual calcium-to-residual sulfuric acid mol ratio of 1.0 and a polymerization degree of 185 was provided.

This cellulose acetate having a substitution degree of 2.1 was spun to prepare a low-substituted cellulose ester fiber. Ten (10) weight % of this low-substituted cellulose fiber was blended with 90 weight % of a commercial cellulose acetate (degree of substitution 2.45) fiber to provide a blended fiber tow for cigaret filters.

Comparative Example 10

Using the same commercial cellulose acetate (degree of substitution 2.45) fiber as used in Example 10, a fiber tow for cigaret filters was prepared.

The fiber tows of Examples 10 and 11 and Comparative Example 10 were compared in terms of biodegradability. The results are shown in Table 5.

TABLE 5

| | biodegradability (%) | | | |
| --- | --- | --- | --- | --- |
| | 1 week | 2 weeks | 3 weeks | 4 weeks |
| Example 10 | 2 | 10 | 18 | 30 |
| Example 11 | 1 | 8 | 19 | 24 |
| Comparative Example 10 | 0 | 0 | 1 | 2 |

It is apparent from Table 5 that although they contained the cellulose acetate of Comparative Example which showed low biodegradation, the fiber tows of Example 10 and 11 showed high biodegradability with 4-week decomposition rates of 30% and 24%, respectively. The fiber tow of Comparative Example 10 gave a 4-week decomposition rate of as low as 2%.

What is claimed is:

1. A biodegradable cellulose ester composition comprising a cellulose ester having an average degree of substitution not exceeding 2.15, an average degree of polymerization from 50 to 250, having residual alkali metal or alkaline earth metal and sulfuric acid, wherein the residual alkali metal or alkaline earth metal and residual sulfuric acid are present in said cellulose esters in an equivalent ratio of from 0.1 to 1.1.

2. A biodegradable cellulose ester composition according to claim 1, wherein said cellulose ester has an average degree of substitution not exceeding 2.15 and shows a 4-week decomposition rate of not less than 60 weight percent as determined according to ASTM D 5209.

3. The biodegradable cellulose ester composition according to claim 1, wherein the average degree of substitution of said cellulose ester is 1.0 to 2.15.

4. The biodegradable cellulose ester composition according to claim 1, wherein the residual sulfuric acid is present in said cellulose ester in an amount in the range from $1.8 \times 10^{-3}$ to $6.0 \times 10^{-2}$ weight percent in terms of $SO_4^{-2}$.

5. The biodegradable cellulose ester composition according to claim 1, wherein said cellulose ester is an organic acid ester of cellulose.

6. The biodegradable cellulose ester composition according to claim 1, wherein said cellulose ester is cellulose acetate.

7. The biodegradable cellulose ester composition according to claim 1, wherein the cellulose ester is a cellulose acetate having an average degree of polymerization in the range of 100 to 200, an average degree of substitution in the range of 1.1 to 2.0, and residual alkali metal or alkaline earth metal and sulfuric acid in an equivalent ratio in the range of 0.5 to 1.1.

8. The biodegradable cellulose ester composition according to claim 1, wherein the composition includes at least one ingredient selected from the group consisting of a plasticizer a photolysis accelerator and a biodegradation accelerator.

9. The biodegradable cellulose ester composition according to claim 8, wherein the plasticizer is at least one species selected from the group consisting of aromatic polycarboxylic acid esters, aliphatic polycarboxylic acid esters, lower fatty acid esters of polyhydric alcohols and phosphoric acid esters.

10. The biodegradable cellulose ester composition according to claim 1, wherein the composition includes an aliphatic polyester or a polycaprolactone.

11. The biodegradable cellulose ester composition according to claim 10, wherein said aliphatic polyester has a molecular weight of 200 to $20 \times 10^4$.

12. The biodegradable cellulose ester composition according to claim 8, wherein said photolysis accelerator is a photosensitizer, anatase titanium dioxide, ethylene-carbon monoxide copolymer or an aromatic ketone-metal salt sensitizer.

13. The biodegradable cellulose ester composition according to claim 8, wherein said photolysis accelerator is an anatase titanium dioxide.

14. The biodegradable cellulose ester composition according to claim 8, wherein said biodegradation accelerator is an organic acid or an ester thereof.

15. The biodegradable cellulose ester composition according to claim 14, wherein said biodegradation accelerator is an organic acid of about 2 to 6 carbon atoms selected from the group consisting of oxo acids and saturated dicarboxylic acids or a lower alkyl ester formed of said organic acid and an alcohol of 1 to 4 carbon atoms.

16. The biodegradable cellulose ester composition according to claim 14, wherein said biodegradation accelerator is citric acid, tartaric acid or malic acid.

17. The biodegradable cellulose ester composition according to claim 2, wherein the composition further comprises either a plasticizer or an aliphatic polyester and either a photolysis accelerator or a biodegradation accelerator.

18. The biodegradable cellulose ester composition according to claim 1, wherein the composition includes, based on 100 parts by weight of cellulose ester, 0 to 100 parts by weight of a plasticizer or aliphatic polyester and 0 to 5 parts by weight of a photolysis accelerator or biodegradation accelerator.

19. The biodegradable cellulose ester composition according to claim 18, wherein the composition includes, based on 100 parts by weight of cellulose ester, 5 to 100 parts by weight of said plasticizer or aliphatic polyester and 0.005 to 5 parts by weight of said photolysis accelerator or biodegradation accelerator.

20. The biodegradable cellulose ester composition according to claim 8, wherein the composition includes 0.1 to 5 parts by weight of said photolysis accelerator based on 100 parts by weight of cellulose ester.

21. A biodegradable cellulose ester composition comprising a plurality of cellulose esters varying in the degree of substitution, wherein the proportion of a cellulose ester having an average degree of substitution not exceeding 2.15, having residual alkaline metal or alkaline earth metal and sulfuric acid, wherein the residual alkaline metal or alkaline earth metal and residual sulfuric acid are present in said cellulose esters in an equivalent ratio of from 0.1 to 1.1, is not less than 10 weight % of the total cellulose ester.

22. The biodegradable cellulose ester composition according to claim 21, wherein said plurality of cellulose esters includes at least one cellulose ester having an average degree of substitution of not less than 2.2, the proportion of the cellulose ester having an average degree of substitution not exceeding 2.15 and showing a 4-week decomposition rate of not less than 60 weight % determined according to ASTM D 5209 is not less than 10 to 90 weight % of the total cellulose ester, and the proportion of the at least one cellulose ester having an average degree of substitution not less than 2.2 is 10 to 90 weight % of the total cellulose ester.

23. The biodegradable cellulose ester composition according to claim 21, wherein the plurality of cellulose esters shows a 4-week decomposition rate of not less than 20 weight % determined according to ASTM D 5209.

24. A molded or formed biodegradable article comprising a biodegradable cellulose ester having an average degree of substitution not exceeding 2.15, and average degree of polymerization from 50 to 250, having residual alkaline metal or alkaline earth metal and sulfuric acid, wherein the residual alkaline metal or alkaline earth metal and residual sulfuric acid are present in said cellulose ester in an equivalent ratio of from 0.1 to 1.1.

25. The biodegradable article of claim 24 which is (i) a film which may be creped, (ii) a sheet, (iii) a net, (iv) a fiber or (v) a fibrous article.

26. A biodegradable fiber or fibrous article comprising (1) a fiber of a cellulose ester having an average degree of substitution not exceeding 2.15, and average degree of polymerization from 50 to 250, having residual alkaline metal or alkaline earth metal and sulfuric acid, wherein the residual alkaline metal or alkaline earth metal and residual sulfuric acid are present in said cellulose ester in an equivalent ratio of from 0.1 to 1.1 or (2) a mixed fiber composed of said fiber (1) and one or more other cellulose ester fibers.

27. The biodegradable article of claim 20 wherein said fiber or fibrous article is a woven fabric, nonwoven fabric, a paper or sheet made by web formation, a cord, an open-mesh structure, a hollow fiber, a tow or a cigaret filter.

28. The biodegradable fibrous article according to claim 26 which comprises a fiber, a blended fiber, a fiber bundle, or a blended fiber bundle, which carries a biodegrading enzyme deposited thereon or incorporated therein.

29. The biodegradable fibrous article of claim 26 which comprises a fiber bundle or a blended fiber bound with a water-soluble adhesive.

30. The biodegradable fibrous article of claim 26 which further comprises a fiber or blended fiber bundle cylindrically wrapped on a take up paper and a cylindrical tip paper disposed at one end of said take up paper, said take up paper and tip paper having gluable margins and being adhered to each other with a water-soluble adhesive in their gluing margins to constitute an integral cylinder.

31. A method of biodegrading a shaped article of cellulose ester which comprises the step of exposing to outdoor conditions a biodegradable article formed from a biodegradable cellulose ester composition comprising a cellulose ester having an average degree of substitution not exceeding 2.15, and average degree of polymerization from 50 to 250, having residual alkaline metal or alkaline earth metal and sulfuric acid, wherein the residual alkaline metal or alkaline earth metal and residual sulfuric acid are present in said cellulose ester in an equivalent ratio of from 0.1 to 1.1.

* * * * *

UNITED STATES PATENT AND TRADEMARK OFFICE
CERTIFICATE OF CORRECTION

PATENT NO.     : 5,478,386
DATED          : December 25, 1995
INVENTOR(S)    : Itoh et al.

It is certified that error appears in the above-identified patent and that said Letters Patent is hereby corrected as shown below:

Title Page,
Item [57], ABSTRACT,
Lines 6-7, please change "ASTM 125209-91" to -- ASTM D 5209 --

Column 2,
Lines 57-58, please change "ASTM 125209-91" to -- ASTM D 5209 --;

Column 4,
Line 16, change "125209-91" to -- D 5209 --;

Column 5,
Line 38, change "ASTM 125209-91" to -- ASTM D 5209 --;

Column 9,
Line 4, change "ASTM 125209-91" to -- ASTM D 5209 --;

Column 10,
Line 38, change "ASTM 125209-91" to -- ASTM D 5209 --.

Signed and Sealed this

Tenth Day of June, 2003

JAMES E. ROGAN
*Director of the United States Patent and Trademark Office*